(No Model.)

E. WALSH, Jr.
GLASS CUTTER AND GUIDE THEREFOR.

No. 507,395. Patented Oct. 24, 1893.

Witnesses
F. R. Cornwall
Hugh V. Wagner

Inventor
Edward Walsh Jr
By Paul Bakewell
atty.

UNITED STATES PATENT OFFICE.

EDWARD WALSH, JR., OF ST. LOUIS, MISSOURI.

GLASS-CUTTER AND GUIDE THEREFOR.

SPECIFICATION forming part of Letters Patent No. 507,395, dated October 24, 1893.

Application filed February 11, 1893. Serial No. 461,914. (No model.)

*To all whom it may concern:*

Be it known that I, EDWARD WALSH, Jr., a citizen of the United States, residing at St. Louis, in the State of Missouri, have invented a new and useful Improvement in Glass-Cutters and Guides Therefor, of which the following is a full, clear, and exact description, reference being had to the accompanying drawings, forming a part of this specification, wherein—

Figure 1:
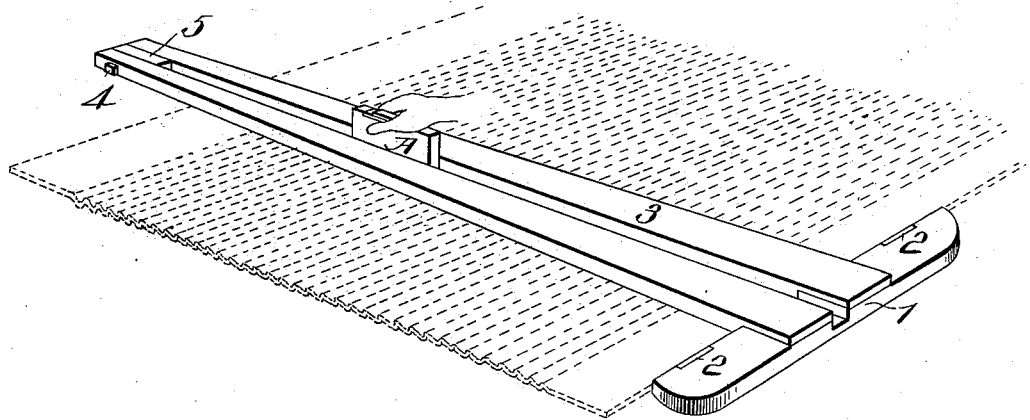
Figure 4:
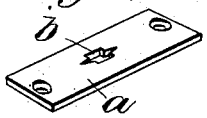
Figure 2:
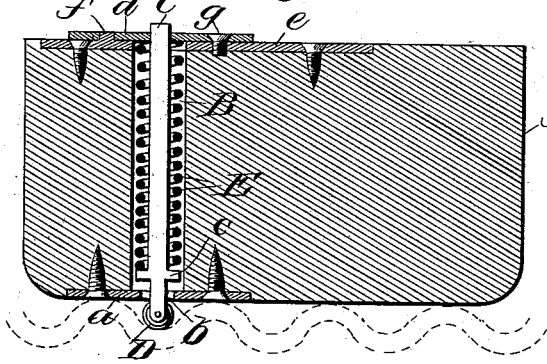
Figure 5:
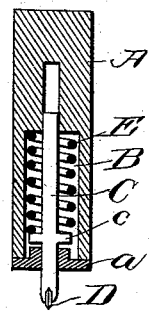
Figure 3:
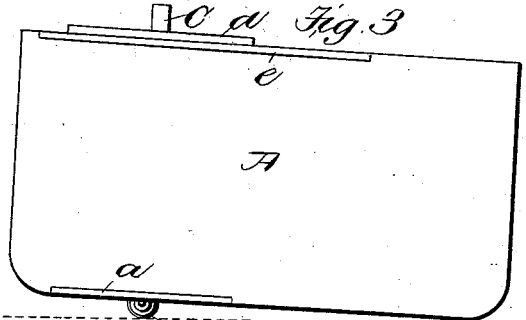

Figure 1 is a perspective view of my improved cutter and guide in position on a sheet of glass. Fig. 2 is a vertical longitudinal section through the cutter, and Fig. 3 is a side elevation of the same illustrating its adaptation to plain or ordinarily surfaced glass. Fig. 4 is a detail of the wear plate. Fig. 5 is a cross section of a modification.

My invention relates more particularly to a glass cutter and guide for special use on glass with an irregular or wavy surface, and consists, generally stated in yieldingly mounting the cutting wheel in the stock in such a way as to enable it to absorb the vibration before it is communicated to the operator and at the same time afford a quickly and positively spring actuated cutting wheel, which will, by its impellent tendency, enter all crevices, indentations, &c., over which it passes, without the additional labor of the operator in twisting and turning which is necessary to meet these conditions when using an ordinary cutter.

The guide consists in a head or stock, having extended therefrom two parallel blades, preferably connected at their ends, as shown, between which blades, the cutter finds a way, and is guided in a straight line without effort on the part of the operator save in the necessary draft required. This guide may be termed, as in common parlance, a slotted T square.

In the drawings, A indicates the cutter stock, consisting preferably, of a block of wood, which as shown, is in the form of an oblong, having its two lower corners rounded to permit of its easily and readily surmounting the crowns or raised portions of the undulating or irregular surface of the glass to which it is especially applicable. On the lower bearing surface of this stock, preferably flush with its face, is a wear and guide plate $a$, which is secured therein by screws, $a'$ and is provided with an opening $b$ for the passage of the cutting wheel and its supporting shank as will hereinafter appear. The stock A has formed therein, either by boring or other means, an opening B, in which is mounted a shank or stem C which supports and carries the cutting wheel D in its lower end.

Projecting laterally from the shank near its lower end are lugs or shoulders $c$ upon which a surrounding compression spring E finds a bearing, asserting at all times, a downward pressure thereon, and consequently, normally forcing the cutting wheel D to its outermost projected position. This shank C is preferably angular in cross section, and its upper end finds a passage through a guide plate $d$ mounted on the upper side of the block A, against which plate, the compression spring E also finds a bearing for its upper end.

Although I have shown the plate $d$ as being secured to a flush plate $e$ by the pin $f$ and the screw $g$, I do not wish to be understood as confining myself to this construction, as it is obvious that the guide plate $d$ may be secured directly on the stock A, similar to the wear plate $a$ if desired, or by slightly changing the construction it may be entirely dispensed with as shown in Fig. 5. In this modification, instead of the shank passing through stock, as is shown in Figs. 2 and 3, it is received in a diametrically reduced opening forming an extension of the compression spring opening B, while to maintain the proper position of the cutting wheel D relative to the stock, I form an extension or boss on the plate $a$ which is provided with an angular opening for slidingly receiving the shank. Also in this instance, and in fact in the construction as illustrated in Figs. 2 and 3, I can taper the wheel supporting end of the shank, and mount therein a cutting wheel whose diameter will permit of its easy passage into the shank opening, which is necessary to entirely absorb the vibration when the cutting wheel is forced up into the shank opening when passing over the crown or high portion of the irregularities in the glass. This feature I accomplish in the construction as shown in Figs. 2 and 3 by forming longitudinally extending grooves in the plate $a$ as shown in Fig. 4 into which the cutting wheel is received.

In cutting glass, it is desirable that a guide be used, for the reason that the following line is dispensed with, and moreover it could not be seen when the cutter is in position for use on glass with a plain surface, as the bearing edge of the stock would be on the surface of the glass and the cutting wheel D would be forced up into the plate $a$ its bearing or cutting edge being flush with the plane of the stock. In complying with the requirements of this special form of cutter, I have found that a slotted T square will admirably answer the purpose, as the parallel sides of the cutter stock fitting snugly in the T square slot, will reduce the side play to a minimum, and insure a straight line, disregarding any irregularities the glass sought to be cut may have, which would under ordinary circumstances tend to throw the cutting wheel off of a true line. This guide consists of a head or stock 1 provided with wearing plates 2 on its inner bearing surface, and has extending therefrom, a slotted blade 3, in this instance, formed by two pieces secured at their outer ends, by a bolt 4 passing therethrough, with an interposed spacing block 5 of the width of the slot. Of course the inner edges of these two pieces are parallel, and should a single blade be used, the slot therein will have parallel sides. The advantages of this form of cutter are numerous, among which I will mention its adaptability to glass with an irregular surface where the cutting blade will be quick and positive, running in and out of all cavities, indentations, &c., and over the crowns, ridges or raised portions, with ease, and at the same time cutting the whole surface in its path with a regular, even cut, without communicating any of its vibration to its operator, which conditions, I believe have never before been met in any other form of cutter. I do not wish therefore, to be understood as confining myself to the exact construction as herein set forth, as many minor changes may be made and substituted for those herein shown and described without in the least departing from the nature and principle of my invention.

Having thus described my invention, what I claim, and desire to secure by Letters Patent, is—

1. In a glass cutter, the combination with the stock of a cutting blade mounted therein a shank or stem therefor provided with lateral projections and a compression spring surrounding said shank and bearing against said projections, substantially as and for the purposes described.

2. In a glass cutter the combination with the cutting blade and its supporting shank, of a wear and guide plate through which the shank passes, said wear plate adapted to receive the cutter blade when the same is forced up thereunto, and a spring for forcing said cutting blade out, substantially as and for the purposes described.

3. In a glass cutter, the combination with the stock having an extended glass bearing surface with rounded corners, of a yielding cutter blade mounted therein, substantially as described.

4. In a glass cutter, the combination with the stock, of a cutting blade shank mounted therein being angular in cross section, a cutting blade mounted in the shank, a spring for forcing said shank and blade outward, and a guide plate for said shank formed with an angular opening, substantially as described.

5. The combination with a glass cutter, having parallel sides, of a T square having a slot in its blade in which the glass cutter is received, substantially as and for the purposes described.

In testimony whereof I hereunto affix my signature, in presence of two witnesses, this 7th day of February, 1893.

EDWARD WALSH, Jr.

Witnesses:
 A. RAMEL,
 HUGH K. WAGNER.